United States Patent [19]

Periard

[11] 3,869,299

[45] Mar. 4, 1975

[54] METHOD OF PREPARING A CALCIUM CARBONATE-MAGNESIUM HYDROXIDE PIGMENT

[75] Inventor: John Neil Periard, Bay City, Mich.

[73] Assignee: The Dow Chemical Company, Midland, Mich.

[22] Filed: Aug. 31, 1973

[21] Appl. No.: 393,703

[52] U.S. Cl. .............................. 106/306, 162/181
[51] Int. Cl. .............................................. C09c 1/02
[58] Field of Search ............ 106/306, 288 B, 308 B

[56] References Cited
UNITED STATES PATENTS

| | | | |
|---|---|---|---|
| 3,088,840 | 5/1963 | Arkless............................ | 106/308 B |
| 3,592,674 | 7/1971 | Mashal et al. ..................... | 106/306 |
| 3,725,100 | 4/1973 | Jentz, Jr. ......................... | 106/288 B |

Primary Examiner—Winston A. Douglas
Assistant Examiner—J. V. Howard
Attorney, Agent, or Firm—Robert W. Selby

[57] ABSTRACT

The present invention relates to an improvement in the method of preparing a magnesium hydroxide-calcium carbonate product which is useful, for example, as a paper pigment. A process for preparing such product involves slaking dolime to convert the calcium oxide and magnesium oxide to their respective hydroxides and then carbonating the calcium hydroxide portion to calcium carbonate. The present improvement comprises employing a slaking solution which contains a water soluble boron compound. The improved process results in a magnesium hydroxide-calcium carbonate product with enhanced optical properties.

21 Claims, No Drawings

METHOD OF PREPARING A CALCIUM CARBONATE-MAGNESIUM HYDROXIDE PIGMENT

BACKGROUND OF THE INVENTION

In paper manufacture, pigments and fillers, e.g., clays, calcium carbonate and titanium dioxide, are applied to the paper to increase the brightness and opacity. The main function of the fillers is to fill the interstices between the fibers in the paper so that an opaque surface is obtained upon calendering the treated paper. Pigments give paper additional features such as smoothness and brightness. As noted, calcium carbonate is a common paper pigment. More recently magnesium hydroxide has been employed (U.S. Pat. No. 3,639,158).

One particular product which has been found to be useful as a paper pigment is partially carbonated slaked dolime. Dolime (calcined dolomite), normally about an equimolar mixture of magnesium oxide and calcium oxide, is slaked to convert the calcium oxide and magnesium oxide to their respective hydroxides. The slaked dolime is then carbonated by, for example, contacting the slaked dolime with a carbon dioxide containing gas to convert only the calcium hydroxide to calcium carbonate. An example of this process is found in U.S. Pat. No. 3,592,674. The composition so prepared can then be employed as a coating or filler pigment.

It is desired to provide an improved method of preparing a magnesium hydroxide-calcium carbonage pigment product with enhanced optical properties.

SUMMARY OF THE INVENTION

It has been found that if the slaking of the dolime in the previously described process for preparing a magnesium hydroxide-calcium carbonate product is carried out in an aqueous slaking solution containing a water soluble boron compound the resultant product has enhanced optical properties. By using such a slaking solution the magnesium hydroxide formed during the slaking operation has a higher porosity and greater surface area than material slaked without the boron compound. The increased surface area is believed to contribute to the improved optical properties of the resultant magnesium hydroxide-calcium carbonate product produced upon partial carbonation of the dolime so slaked.

While any addition of the boron compound to the aqueous slaking solution will be effective in improving the optical properties of the magnesium hydroxide-calcium carbonate product, preferably sufficient boron compound is present in the solution to provide a weight ratio of boron compound to dolime within the range of from about 1:1000 to about 1:1 and more preferably with a weight ratio within the range of from about 1:100 to about 1:10.

DESCRIPTION OF THE PREFERRED EMBODIMENTS

In carrying out the present invention, calcined dolomite or dolime is slaked in a water solution containing an effective amount of a boron compound. Preferably such slaking is carried out at an elevated starting temperature, e.g., about 50° to 100°C. and more preferably about 90° to 100°C. Slaking is preferably conducted to the point where essentially all of the calcium oxide and magnesium oxide are converted to their respective hydroxides, i.e., calcium hydroxide and magnesium hydroxide. Slaking times on the order of 10 minutes to 100 hours can be employed. Most preferably the boron compound is added to a water-dolime mixture or an aqueous dolime slurry after slaking the dolime for a short time period to reduce the particle size of the dolime to preferably less than about 100 and even more preferably less than 200 mesh (Tyler Sieve series).

The water soluble boron compound is preferably selected from at least one of the compounds ortho boric acid ($H_3BO_3$), meta boric acid ($HBO_2$), tetra boric acid ($H_2B_4O_7$), boron oxide ($B_2O_3$), ethyl boric acid [($C_2H_5$)B(OH)$_2$], butyl boric acid [$C_4H_9$B(OH)$_2$], magnesium ortho borate [$Mg_3(BO_3)_2$] and meta, penta, peroxy and tetra borates of sodium, potassium, lithium and ammonium. The boric acid compounds and especially ortho boric acid ($H_3BO_3$) are preferable.

The slaked dolime is reacted with carbon dioxide using, for example, a suitable carbon dioxide containing gas to carbonate the calcium hydroxide portion thereof leaving the magnesium hydroxide uncarbonated. The gaseous effluent of a kiln used to calcine dolomite can be advantageously employed in this carbonation step. These gases contain approximately 20–25 percent by volume of $CO_2$. The calcium hydroxide carbonates preferentially to the magnesium hydroxide. Care must be taken in the carbonation step so as to terminate carbonation prior to the carbonation of the magnesium hydroxide portion of the slaked dolime slurry. The carbonation can be monitored by sample titrations to prevent such magnesium carbonate formation. Conversion to magnesium carbonate is undesirable because of its high solubility compared to that of magnesium hydroxide and because of an increased viscosity of the slurry.

Thereafter, the slurry, as carbonated, may optionally be subjected to a series of repetitive filtering and pulping steps to increase the solids content to about 60 percent by weight. An even higher solids content slurry is possible by adding a small quantity, e.g., from 0.5 to 1.5 percent, of a dispersant, such as e.g., sodium hexametaphosphate, sodium tetraphosphate, casein, gum arabic, sodium silicate, etc., during the later pulping operations. A suitable type of repetitive filtering and pulping operations as described herein is disclosed in U.S. Pat. No. 3,197,322 and may be used to advantage in the present invention. The slurry may thereafter be dried or may be shipped and used directly in a pigment application.

In carbonating the slaked dolime slurry in accordance with the present invention, means should be employed which will rapidly and efficiently convert the calcium hydroxide portion of the dolime slurry to calcium carbonate. Such means include a so-called Turbo Carbonator, a commercial device. Briefly, this device consists of a motor driven impeller which is normally immersed in the slurry and surrounded by a ring in the nature of a circular section having a multiplicity of slots therearound. A carbon dioxide gas is passed into the impeller zone which, when rotated rapidly, circulates the slurry and concurrently disperses the gas therein, whereupon, carbonation occurs.

Progress of the carbonation of the calcium hydroxide may be followed or monitored by use of a standard pH instrument or by rapidly titrating small samples of the carbonated slurry diluted in water to, e.g., a phenolphthalein end-point with 1 normal hydrochloric acid to insure that carbonation of any significant amount of the magnesium hydroxide does not occur.

Dolomitic limestone, which may be used in the process of the present invention, include, for example, high purity dolomite obtained from Ohio or Cedarville, Michigan and other high purity dolomite minerals. Preferably those dolomites comprising approximately an equimolar mixture of magnesium and calcium carbonates and having a low impurity content are employed since generally impurities detract from the ultimate whiteness of the pigment product made hereby. Usually impurities such as silicon dioxide, iron oxide and aluminum oxide are undesirable.

By means of the present invention a pigment composition comprising a dry or slurried mixture essentially of calcium carbonate and magnesium hydroxide is obtained. This product is characterized by a high whiteness and/or brightness, a high opacifying power, and a low viscosity property in the slurry. Moreover, because of the high solids content which can be obtained in a slurry of the product, the product can be readily handled, such as by pumping, and relatively economically shipped and marketed in the slurry form.

The composition made by the method of the present invention can be used as a coating pigment. The pigment can be applied on a paper web by means of a blade or roll coater applicator from an aqueous dispersion containing binders such as starch, protein or latex, and which may include other common pigments such as clay (kaolin). When used as such, the high whiteness and the good opacifying power of the product is superior to many of the conventional clay and $CaCO_3$ based pigments used.

The pigment has also utility as a paper filler in which case, it is dispersed with the pulp fibers and thus becomes internally combined with the paper web as it is formed on the paper machine from the pulp finish. Due to the pigment's solubility in acids it is recommended for systems operating at at least a Ph of 6 and preferably in neutral or alkaline systems.

Whiteness and opacifying power of the present novel pigment composition relative to conventional pigments can be determined by use of conventional apparatus. For example, a Bausch and Lomb Spectrophotometer can be employed for comparing the reflectance of the dry test specimen relative with a standard dry MgO specimen which is considered to have a 100 percent reflectance. The opacifying power of the pigment composition can be estimated by the Milton-Jacobsen method, whereby a coating is cast on a black glass panel with a Bird doctor blade at a thickness of about one mil and then drying such coating at about 20°C. at about 50 percent relative humidity. A 5 square inch area of this slightly translucent film is measured for reflectance, $R_B$, and likewise, the reflectance $R\infty$ of a thick layer which had been cast on a white glass panel and then dried as above described. These readings are then converted by means of published graphs into values of scattering power. The measured area of the coating is removed from the black glass and weighed, thus enabling expression of the scattering coefficient, SC, in terms of an accurately known coating weight unit (lbs. per TAPPI ream).

The following example serves to further illustrate the improved method of the present invention.

Two aqueous slurries of reactive Cedarville dolime were prepared. One sample containing 1,725 grams of dolime was digested with agitation for 5 minutes at 100°C. to obtain a finely divided suspension. To this suspension was added 19 grams of $H_3BO_3$ powder. No boric acid was added to the second sample. The slurry samples were then digested with agitation for 16 hours at 100°C. The digested slurries were degritted with a 100 mesh screen. Two liters of slurry from each sample were carbonated at 50°C. with a mixed gas containing 25 percent $CO_2$ and 75 percent air. Such carbonation formed a magnesium hydroxide-calcium carbonate product. The resultant slurry was evaluated in the hereinbefore described standard paper coating tests. The sample prepared by slaking without the presence of boric acid had a scattering coefficient of 0.175. The sample prepared by slaking with the boric acid present in the slaking solution had a scattering coefficient of 0.187 (an average of 2 slurry samples). Thus, it is demonstrated that the presence of the boric acid in the slaking solution produces a significantly improved opacity in the resultant product.

In like manner other slaking solutions containing water soluble boron compounds can be employed in the previously described process to provide an improved magnesium hydroxide-calcium carbonate pigment.

What is claimed is:

1. In a method of preparing a magnesium hydroxide-calcium carbonate product wherein dolime is slaked to hydrate calcium oxide to calcium hydroxide and magnesium oxide to magnesium hydroxide and the slaked dolime is carbonated to convert the calcium hydroxide to calcium carbonate, the improvement which comprises slaking the dolime in an aqueous solution containing a water soluble boron compound, thereby further enhancing the optical properties of the resultant magnesium hydroxide-calcium carbonate product.

2. The improvement of claim 1 wherein sufficient boron compound is present in the slaking solution to provide a weight ratio of boron compound to dolime within the range of from about 1:1000 to 1:1.

3. The improvement of claim 1 wherein sufficient boron compound is present in the slaking solution to provide a weight ratio of boron compound to dolime within the range of from about 1:100 to 1:10.

4. The improvement of claim 1 wherein the boron compound is selected from the group consisting of ortho boric acid, meta boric acid, tetra boric acid, boron oxide, ethyl boric acid, butyl boric acid, magnesium ortho borate and meta, penta, peroxy and tetra alkali and ammonium borates.

5. The improvement of claim 1 wherein the boron compound is selected from the group consisting of ortho boric acid, metal boric acid and tetra boric acid.

6. The improvement of claim 1 wherein the boron compound is ortho boric acid.

7. The improvement of claim 6 including adding the ortho boric acid to a water-dolime mixture.

8. The improvement of claim 7 including contacting the magnesium oxide with the ortho boric acid during hydration of the magnesium oxide and before carbonation.

9. The improvement of claim 8 wherein sufficient ortho boric acid is present in the slaking solution to provide a weight ratio of ortho boric acid to dolime within the range of from about 1:1000 to about 1:1.

10. The improvement of claim 4 including adding the boron compound to a water-dolime mixture.

11. The improvement of claim 10 including contacting the magnesium oxide with boron compound during hydration of the magnesium oxide and before carbonation.

12. The improvement of claim 11 wherein sufficient boron compound is present in the slaking solution to provide a weight ratio of boron compound to dolime within the range of from about 1:1000 to about 1:1.

13. The improvement of claim 12 wherein sufficient boron compound is present in the slaking solution to provide a weight ratio of boron compound to dolime within the range of from about 1:100 to about 1:10.

14. The improvement of claim 1 including adding the boron compound to an aqueous dolime slurry.

15. The improvement of claim 1 including adding the boron compound to the partially slaked water-dolime mixture.

16. The improvement of claim 15 wherein the partially slaked dolime has a particle size of less than about 100 mesh.

17. The improvement of claim 5 including adding the boron compound to the partially slaked water-dolime mixture.

18. The improvement of claim 6 including adding the boron compound to the partially slaked water-dolime mixture.

19. The improvement of claim 18 wherein sufficient ortho boric acid is present in the slaking solution to provide a weight ratio boric acid to dolime within the range of from about 1:100 to about 1:10.

20. The improvement of claim 1 wherein slaking is carried out within a temperature range of from about 50° to about 100°C.

21. The improvement of claim 1 wherein slaking is carried out within a temperature range of from about 90° to about 100°C.

* * * * *

UNITED STATES PATENT OFFICE
CERTIFICATE OF CORRECTION

PATENT NO. : 3,869,299
DATED : March 4, 1975
INVENTOR(S) : John Neil Periard

It is certified that error appears in the above-identified patent and that said Letters Patent are hereby corrected as shown below:

Col. 2, line 59, after "dioxide" insert --containing--.

Signed and Sealed this fifth Day of August 1975

[SEAL]

Attest:

RUTH C. MASON
Attesting Officer

C. MARSHALL DANN
Commissioner of Patents and Trademarks